United States Patent
Wheeler et al.

(10) Patent No.: US 6,662,698 B2
(45) Date of Patent: Dec. 16, 2003

(54) SAW BLADE CLAMP SYSTEM

(75) Inventors: Thomas J. Wheeler, Baltimore, MD (US); Nicholas E. Achterberg, Trappe, MD (US); Thomas M. Gaffney, Lutz, FL (US)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 10/038,267

(22) Filed: Jan. 2, 2002

(65) Prior Publication Data

US 2003/0121387 A1 Jul. 3, 2003

(51) Int. Cl.⁷ ............................................... B27B 19/02
(52) U.S. Cl. ................................. 83/699.21; 83/698.71
(58) Field of Search ..................... 30/392, 393, 394; 83/699.21, 699.31; 206/372

(56) References Cited

U.S. PATENT DOCUMENTS

| | | |
|---|---|---|
| 2,049,898 A | 8/1936 | Driest |
| 2,565,344 A | 8/1951 | Benham |
| 2,866,485 A | 12/1958 | Anton |
| 2,987,086 A | 6/1961 | Westlund, Jr. |
| 3,028,890 A | 4/1962 | Atkinson et al. |
| 3,033,251 A | 5/1962 | Atkinson et al. |
| 3,114,402 A | 12/1963 | Jacoff |
| 3,259,158 A | 7/1966 | Garamy |
| 3,338,278 A | 8/1967 | Reuterfors |
| 3,521,686 A | 7/1970 | Weinmann |
| 3,555,678 A | 1/1971 | Agulnick et al. |
| 3,583,716 A | 6/1971 | Daniel, Jr. |
| 3,750,283 A | 8/1973 | Hoffman |
| 3,802,079 A | 4/1974 | Ketchpel, Jr. et al. |
| 3,804,238 A * | 4/1974 | Howard ................... 206/459.5 |
| 3,823,473 A | 7/1974 | Hoffman |
| 3,927,893 A | 12/1975 | Dillon et al. |
| 3,964,163 A | 6/1976 | Russo |
| 4,011,657 A | 3/1977 | Vance |
| 4,020,555 A | 5/1977 | Hedrick |
| 4,083,112 A | 4/1978 | Palm |
| 4,106,181 A | 8/1978 | Mattchen |
| 4,204,692 A | 5/1980 | Hoffman |
| 4,285,129 A | 8/1981 | Hoffman |
| 4,294,013 A | 10/1981 | Krieg |
| 4,299,402 A | 11/1981 | Hoffman |
| 4,351,112 A | 9/1982 | Nalley |
| 4,441,255 A | 4/1984 | Hoffman |
| 4,470,196 A | 9/1984 | Hoffman |

(List continued on next page.)

FOREIGN PATENT DOCUMENTS

| | | |
|---|---|---|
| DE | 2735540 A1 | 2/1978 |
| DE | 19737236 A1 | 3/1999 |
| DE | 19737237 A1 | 4/1999 |
| DE | 19947840 A1 | 4/2000 |
| DE | 19951040 A1 | 5/2000 |
| DE | 20013789 U1 | 1/2001 |
| EP | 0722802 B1 | 11/1998 |
| EP | 0582326 B1 | 2/1999 |
| EP | 0755313 B1 | 7/1999 |
| EP | 0693341 B1 | 12/1999 |
| GB | 1484393 | 9/1977 |
| GB | 1597240 | 9/1981 |
| GB | 2173734 A | 10/1986 |
| WO | WO89/08524 | 9/1989 |
| WO | WO93/05915 | 4/1993 |
| WO | WO95/27583 | 10/1995 |

*Primary Examiner*—Allan N. Shoap
*Assistant Examiner*—Ghassen Alie
(74) *Attorney, Agent, or Firm*—Harness, Dickey & Pierce, P.L.C.

(57) ABSTRACT

A saw blade retaining apparatus is provided for selectively retaining one in a series of saw blades having unique thicknesses. The retaining apparatus includes a rocker arm supported by a pair of lateral walls. The rocker arm includes a contoured contact surface which cooperates with a contoured stop segment extending between the lateral walls to securely retain one of a series of saw blades having unique thicknesses.

7 Claims, 5 Drawing Sheets

U.S. PATENT DOCUMENTS

| | | | |
|---|---|---|---|
| 4,508,221 A | * | 4/1985 | Olson .................. 206/379 |
| 4,528,753 A | | 7/1985 | Kuhlmann et al. |
| 4,550,500 A | | 11/1985 | Kuhlmann et al. |
| 4,594,781 A | | 6/1986 | Hoffman |
| 4,601,477 A | | 7/1986 | Barrett et al. |
| 4,648,182 A | | 3/1987 | Hoffman |
| 4,739,557 A | | 4/1988 | Wagner |
| 4,941,246 A | | 7/1990 | Finnegan |
| 5,058,280 A | | 10/1991 | Pollak et al. |
| 5,103,565 A | | 4/1992 | Holzer, Jr. |
| 5,165,173 A | | 11/1992 | Miller |
| 5,233,892 A | | 8/1993 | Roberts |
| 5,272,948 A | | 12/1993 | Theising |
| 5,322,302 A | * | 6/1994 | Quirijnen .................. 279/22 |
| 5,324,052 A | | 6/1994 | Ortmann |
| 5,340,129 A | | 8/1994 | Wright |
| 5,351,590 A | | 10/1994 | Everts et al. |
| 5,363,733 A | | 11/1994 | Baird et al. |
| 5,402,580 A | | 4/1995 | Seto et al. |
| 5,421,232 A | | 6/1995 | Laverick |
| 5,433,457 A | | 7/1995 | Wright |
| 5,439,472 A | | 8/1995 | Evans et al. |
| 5,443,276 A | | 8/1995 | Nasser et al. |
| 5,458,346 A | | 10/1995 | Briggs |
| 5,487,221 A | | 1/1996 | Oda et al. |
| 5,573,255 A | | 11/1996 | Salpaka |
| 5,575,071 A | | 11/1996 | Phillips et al. |
| 5,634,277 A | | 6/1997 | Wada et al. |
| 5,647,133 A | | 7/1997 | Dassoulas |
| 5,697,279 A | | 12/1997 | Schnizler et al. |
| 5,722,309 A | | 3/1998 | Seyerle |
| 5,794,352 A | | 8/1998 | Dassoulas |
| 5,810,367 A | | 9/1998 | Holzer, Jr. et al. |
| 5,829,082 A | * | 11/1998 | Moreira .................. 7/167 |
| 5,903,983 A | | 5/1999 | Jungmann et al. |
| 5,987,758 A | * | 11/1999 | McCurry et al. .............. 30/392 |
| 6,009,627 A | | 1/2000 | Dassoulas et al. |
| 6,023,848 A | | 2/2000 | Dassoulas et al. |
| 6,101,726 A | * | 8/2000 | Laverick .................. 30/392 |
| 6,105,482 A | | 8/2000 | Garcia et al. |
| 6,112,420 A | * | 9/2000 | Schickerling .................. 30/392 |
| 6,237,231 B1 | | 5/2001 | Jungmann et al. |
| 6,453,565 B1 | * | 9/2002 | Phillips .................. 30/392 |
| 6,467,177 B2 | * | 10/2002 | Eichberger .................. 30/392 |
| 6,502,317 B2 | * | 1/2003 | Dassoulas et al. ............ 30/392 |
| 2002/0017026 A1 | * | 2/2002 | Kakiuchi et al. .............. 30/392 |

* cited by examiner

SAW BLADE CLAMP SYSTEM

FIELD OF THE INVENTION

The present invention relates generally to clamp systems for saw blades, and more particularly to a clamp system able to secure any saw blade in a series of saw blades having various thicknesses.

BACKGROUND

Clamp systems are incorporated in jig saws and other reciprocating saws to securely retain a shank portion of a saw blade during cutting. A conventional configuration of a clamp system includes the use of a retaining arm that interfaces with a hole or feature a certain distance from the end of the blade. To minimize cost on the clamping system, one retaining arm is implemented that has one optimum travel path having a limited tolerance for various blade thicknesses.

It is common for a saw operator to require the use of a variety of saw thicknesses for a single project. Accordingly, the operator must switch blades for a given purpose. For example, a thin blade (0.030–0.039 inch) is needed for a fast cut or in cutting metal. A medium thickness blade (0.040–0.049 inch) is needed for general purpose cutting. A thick blade (>0.049 inch) is needed for heavy duty purposes. The variety of blade thicknesses presents a problem for a clamping system unable to effectively adjust to the blade in use. Consequently, the retaining arm may be bottomed out and unable to effectively retain the shank of the saw blade. Additionally, blade wiggle can occur resulting in inconsistent cuts and overall poor performance.

It is therefore desirable to provide a versatile clamping system that allows a variety of blades having a variety of thicknesses to be securely retained.

SUMMARY OF THE INVENTION

It is a general object of the present invention to provide a saw blade clamp system that more effectively secures one of a series of saw blades having various thicknesses.

In one form, the present invention provides a retaining apparatus for selectively retaining one of a series of saw blades. The apparatus includes a support structure including a pair of lateral walls and a base portion extending between the pair of lateral walls, a rocker arm having a first contact surface, the rocker arm supported between the pair of lateral walls; a stop having a second contact surface and disposed between the pair of lateral walls; wherein the rocker arm is operable toward a saw blade of the series of saw blades whereby the first contact surface interfaces with an aperture of the saw blade and the second contact surface interfaces with a trailing edge of the saw blade for securing the saw blade within the retaining apparatus.

In another form, the present invention provides a retaining apparatus for selectively retaining one of a series of saw blades. The apparatus includes a support structure including a pair of lateral walls and a base portion extending between the pair of lateral walls, a rocker arm having a first contact surface and supported by the pair of lateral walls; a stop having a second contact surface and disposed between the pair of lateral walls; a first saw blade having an edge for communication with the stop and a mounting aperture for communication with the rocker arm, the mounting aperture disposed inboard a first predetermined distance from the edge and a second saw blade having an edge for communication with the stop and a mounting aperture for communication with the rocker arm, the mounting aperture disposed inboard a second predetermined distance from the edge, wherein the first predetermined distance is greater than the second predetermined distance and the second saw blade has a thickness greater than the first saw blade.

In yet another form, the present invention provides a series of saw blades each including an elongated body having a blade end and a mounting end, the mounting end having an end edge and an aperture disposed therein. The series of saw blades includes a first blade having a first predetermined thickness and a first predetermined distance between the end edge and the aperture, and a second saw blade having a second predetermined thickness greater than the first predetermined thickness of the first blade and a distance between the end edge and the aperture that is less than the first predetermined distance.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figures 1, 2:
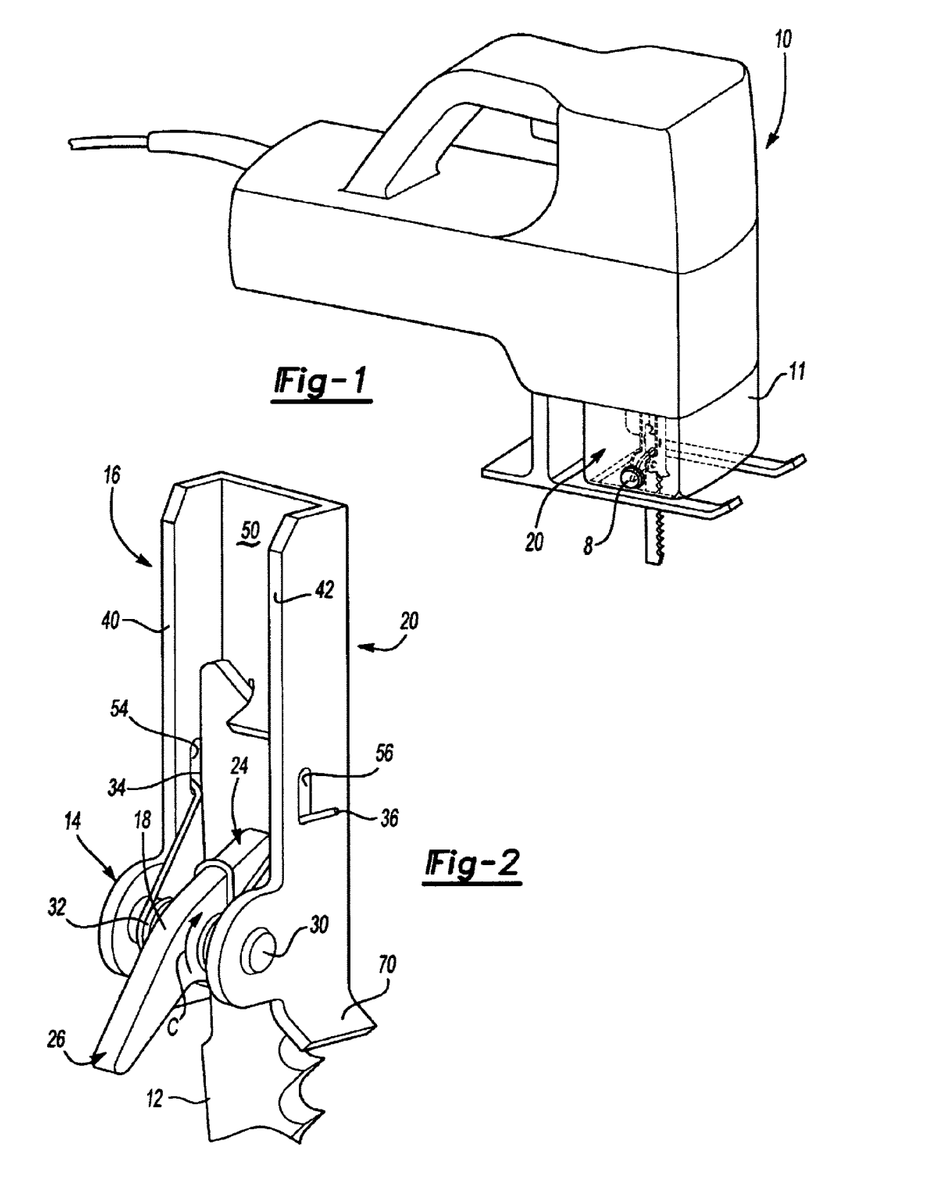
FIG. 1 is an environmental view of the saw blade retaining mechanism shown in a jig saw.
FIG. 2 is a perspective view of the saw blade retaining mechanism.
Figures 4, 5:
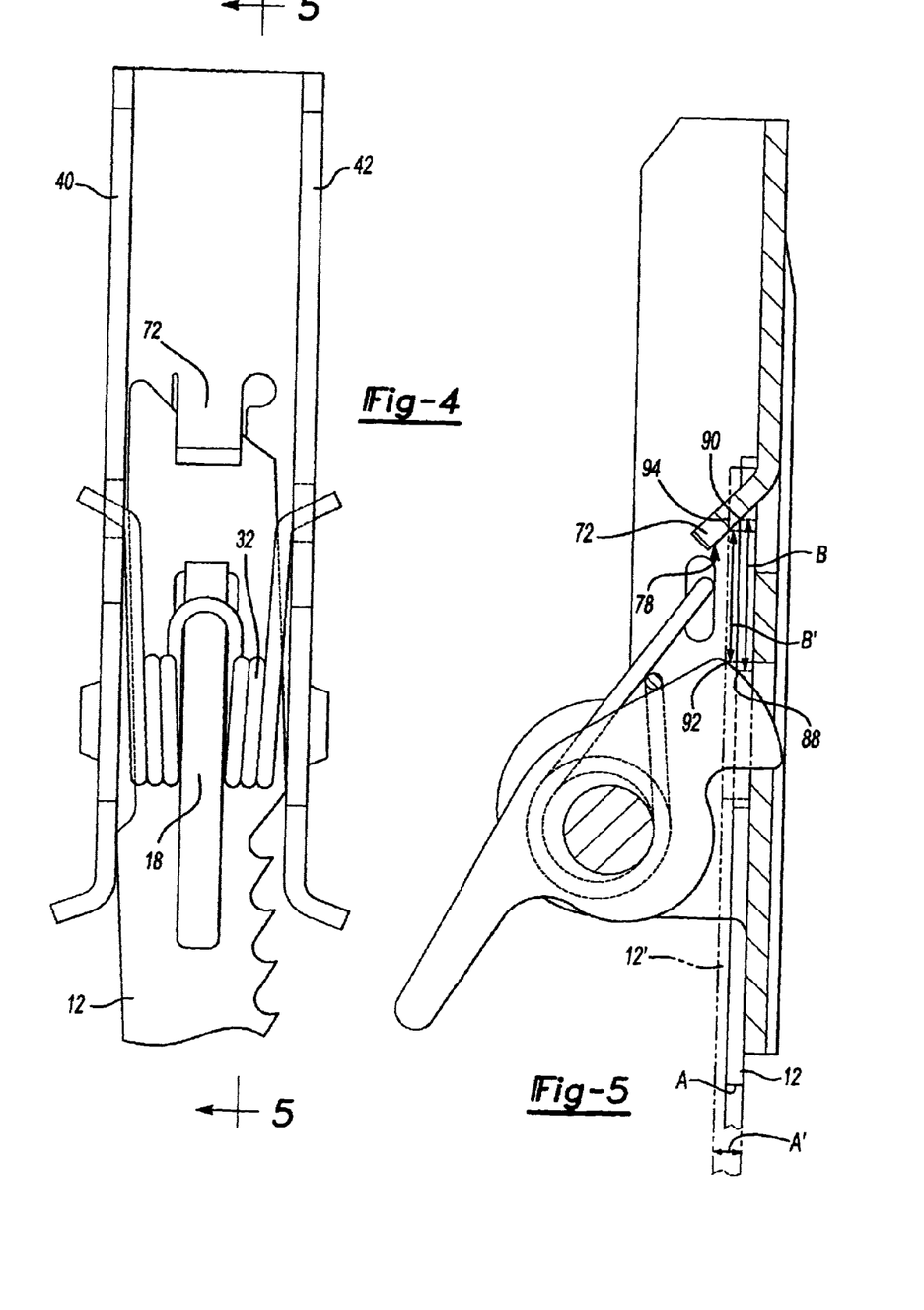
FIG. 4 is a plan view of the saw blade retaining mechanism.
FIG. 5 is a side view of the saw blade retaining mechanism taken along line 5—5 of FIG. 4 shown operatively retaining a first or second saw blade having different thicknesses.

With initial reference to the perspective view of FIG. 1, a retaining mechanism or clamp device 20 according to the teachings of the present invention is illustrated within a housing 11. The housing 11 includes push button 8 which is operable to disengage the clamp device 20. The clamp device 20 is shown operatively interconnected to a conventional jig saw 10 and is configured to securely retain a plurality of saw blades having a variety of thicknesses. For example, as shown in FIG. 5, the clamp device 20 is configured to securely retain a first or second blade 12, 12' with different thicknesses.

For exemplary purposes, blades 12 and 12' are provided in the illustrations. Blade 12 has a thickness A of 0.035 inches (0.89 mm) and blade 12' has a thickness A' of 0.05 inches (1.27 mm). Blades 12 and 12' generally fit the "thin" and "thick" blade categories respectively.

Figure 3:
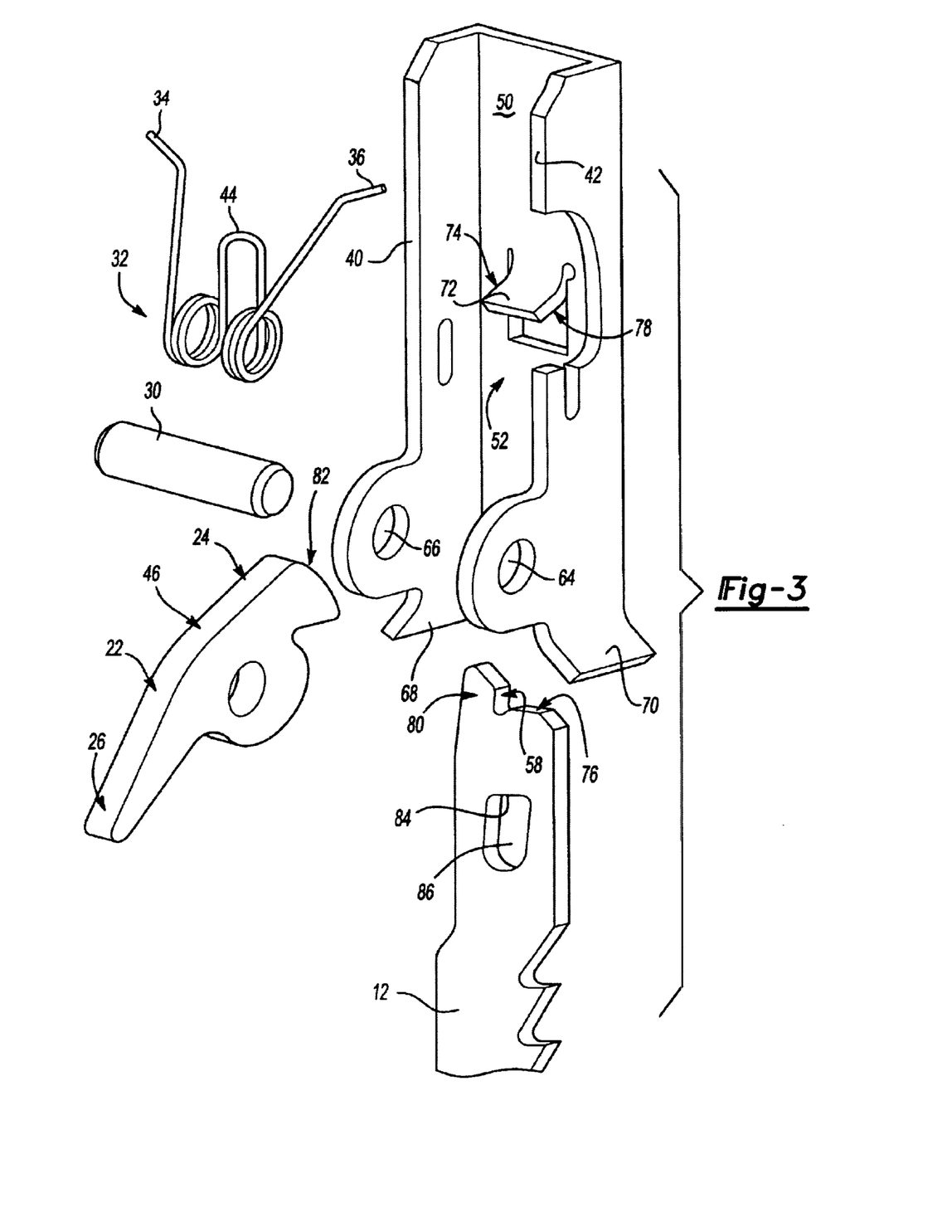
FIG. 3 is an exploded perspective view of the saw blade retaining mechanism.

With continued reference to FIG. 1, and additional reference to FIGS. 2 and 3 wherein the housing 11 and push button 8 have been removed for illustrative purposes, the retaining mechanism 20 generally includes a cam system 14 and base 16. The cam system 14 includes a rocker arm 18 having a lever end 26, an intermediate pivot portion 22 and a clamp end 24. The intermediate pivot portion 22 is adapted to receive a support shaft 30 therethrough for rotational movement thereabout. The lever end 26 is activated by the push button 8 mounted on the housing 11, shown in FIG. 1.

Rocker arm 18 is biased in a clockwise direction (arrow C) such that the clamp end 24 is influenced against the saw blade 12. Spring 32 includes a first and second end 34, 36 fixedly attached to a first and second side wall 40, 42 of base 16. An intermediate loop 44 of the spring 32 is adapted to communicate with an upper surface 46 of the rocker arm 18 to provide a biasing force thereat.

With particular reference to FIGS. 2 and 3, the base 16 includes a floor 50 having first and second side walls 40, 42 extending perpendicularly therefrom defining a channel 52. The first and second side walls 40, 42 include first and second spring mounting passages 54, 56 for fixedly securing the spring ends 34, 36 therethrough. Similarly, support shaft 30 is retained through apertures 64, 66 disposed in walls 40, 42 respectively. The ends of first and second side walls 40, 42 are contoured outwardly creating first and second guide flanges 68, 70. The guides 68, 70 serve to help direct the blade 12 into the channel 52. The floor 50 of the base 16 includes a stop 72. Stop 72 is oriented at an angle toward the cam system 14.

Referring now to FIGS. 2 and 3, the operation of the retaining mechanism 20 will now be described using saw blade 12. To install blade 12 in the retaining mechanism 20, the blade 12 is inserted through channel 52 against the clamp end 24 of cam system 14 until the outer edge 76 of the blade 12 abuts the angled contact surface 78 of stop 72. Tail section 80 of blade 12 extends between stop 72 and the first side wall 40 to provide the blade 12 with additional stability. Side surface 74 of stop 72 provides a cutting bias against surface 58 of tail section 80 of blade 12. Once the blade is fully inserted, spring 32 biases the contoured contact surface 82 of the clamp end 24 against the aperture wall 84 of the blade 12 thereby securing the blade 12 to the retaining mechanism 20. Contoured contact surface 82 of clamp end 24 interfaces aperture wall 84 thus providing a secure edge contact therewith. Accordingly, the contoured contact surface 82 of clamp end 24, the angled contact surface 78 and side surface 74 of stop 72 counter the forces created during cutting or other operations. To remove the blade, the push button 8 is pressed against the lever end 26 of rocker arm 18 to disengage the clamp end 24 from the aperture wall 84 of the blade 12. Saw 10 prevents the user from turning on the unit while push button 8 is depressed. Similarly, push button 8 will not depress while saw 10 is in operation.

Referencing FIGS. 2, 4 and 5, the installation of second blade 12' (which has a greater thickness A' than thickness A of the first blade) is the same as described for the first blade 12. The geometry of the angled contact surface 78 of stop 72 and the contoured contact surface 82 of rocker arm 18 is such that blades having different thicknesses may be securely retained. Explained further, blade 12 having a thickness "A" and a mounting aperture 86 a distance "B" from the outer edge 76 of the blade 12 is located securely between the contoured contact surface 82 of the clamp end 24 and the angled stop contact surface 78 at contact points 88, 90 respectively. Likewise, blade 12' having a greater thickness, "A'" and a smaller distance "B'" from the outer edge of the saw may be separately retained in the clamp device 20 but has contact points 92, 94 located a distance higher on the respective clamp and stop contact surfaces 82, 78 respectively. As such, the geometry of the clamp contact surface 82 and the angled stop contact surface 78 cooperate to provide a versatile configuration that allows a variety of blades having a variety of thicknesses to be independently securely located at various contact points therebetween.

Figure 6:
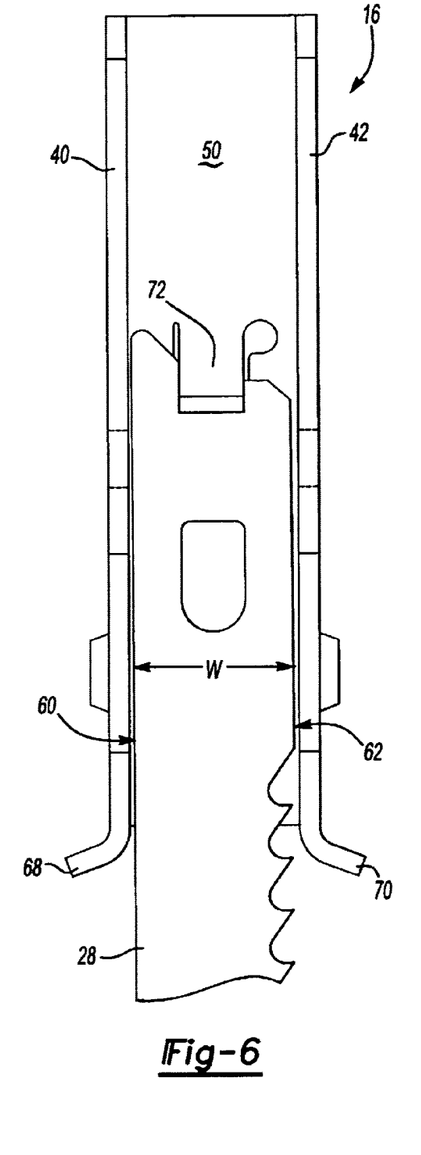
FIG. 6 is a plan view of the saw blade retaining mechanism shown with the clamp system removed and a non canted blade positioned therein.
Figure 7:
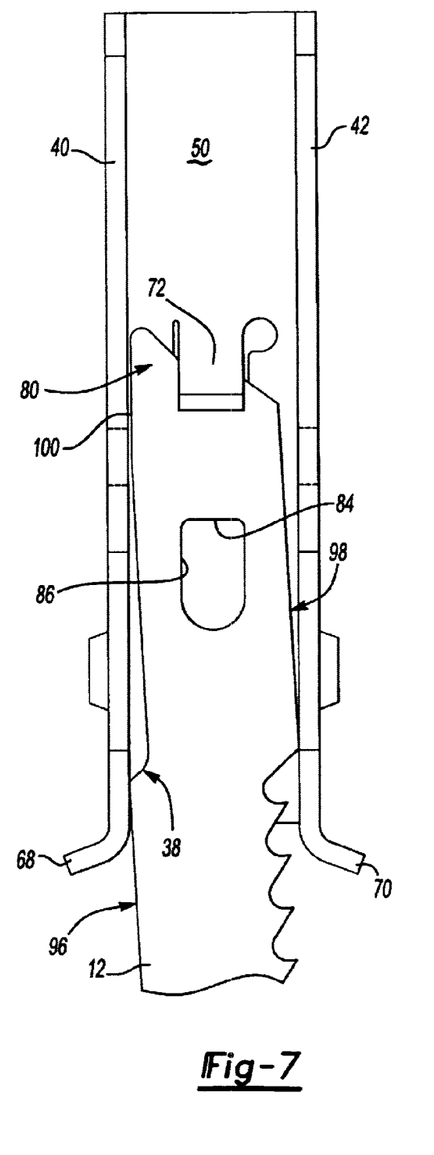
FIG. 7 is a plan view of the saw blade retaining mechanism shown with the clamp system removed and a canted blade positioned therein.
Figure 8:
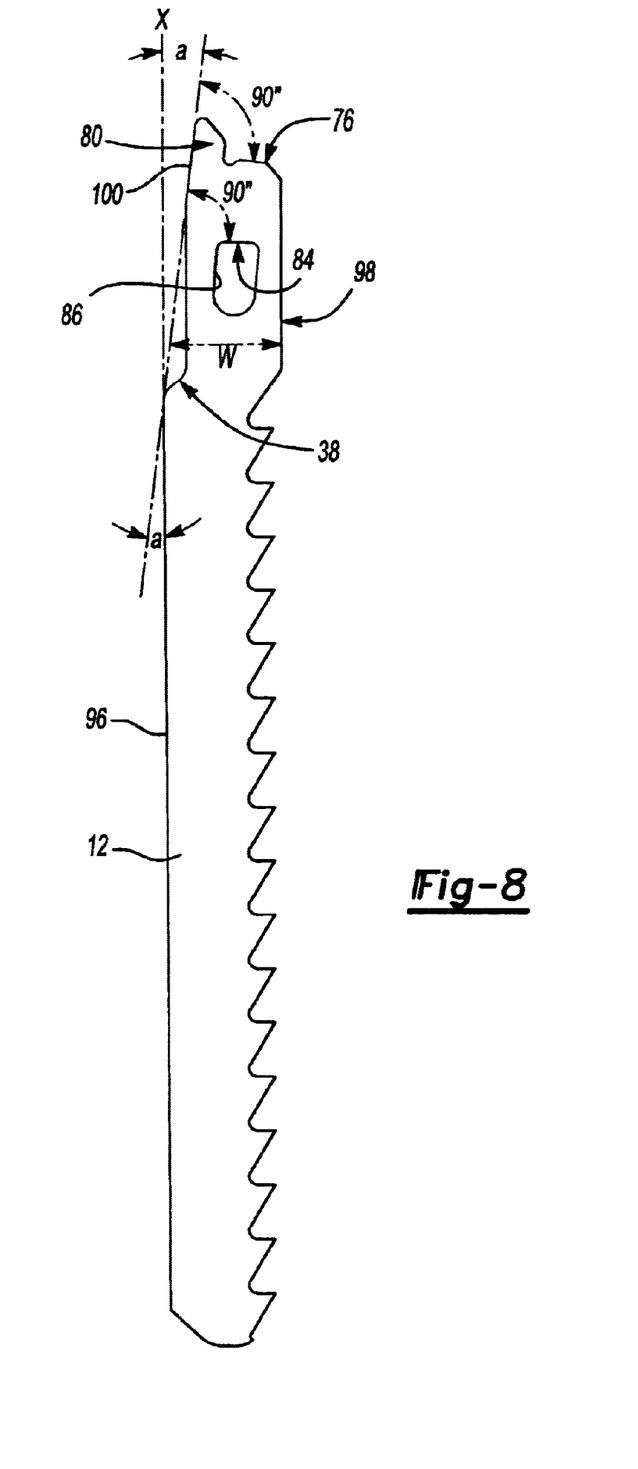
FIG. 8 is a plan view of the canted saw blade.

Turning now to FIGS. 6, 7 and 8, the retaining mechanism 20 of the present invention is operable to securely retain blade 12 which incorporates an integrated cant angle "a" (illustrated best in FIG. 8), as well as a blade 28 having no cant angle (FIG. 6). An important feature of canted blade 12 is that it includes a step 38 incorporated in the shank of the blade as well as an angled tail section 80. The step 38 and angled tail section 80 of the blade shank design allows for a canted blade to be formed using standard manufacturing methods and using raw-material strips having the same widths "W" that apply to blades having no cant angle (as illustrated in FIGS. 6 and 8). As such, a canted blade can be provided for no additional cost compared to the zero canted blades. Explained further, edges 60, 62 of non-canted blade 28 are separated an equivalent distance (designated "W" on FIG. 6) as parallel edges 96, 98 of canted blade 12 (designated "W" on FIG. 8). Accordingly, canted blade 12 with step 38 and angled tail section 80 can be stamped from a material strip no wider than used for blade 28. The angled tail section 80 of canted blade 12 includes a side surface 100 which is angled slightly relative to a longitudinal axis offset an angle "a" from the longitudinal axis "x" of the blade 12. The mounting aperture 86 of the blade 12 is also angularly oriented such that the rear aperture wall 84 is perpendicular to the side surface 100 of the angled tail section 80 so that the aperture wall 84 is oriented perpendicular to the side walls 40, 42. The outer edge 76 at the rear of the blade 12 is also perpendicular to the side surface 100.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A blade retaining apparatus for selectively retaining a saw blade, the apparatus comprising:
   a support structure including a pair of lateral walls and a base portion extending between said pair of lateral walls;
   a rocker arm having a first contact surface, said rocker arm supported between said pair of lateral walls;
   a stop extending from said base portion and having a second contact surface, said second contact surface of said stop extends at an acute angle relative to said base portion; and
   wherein the rocker arm is operable toward the saw blade whereby said first contact surface interfaces with an aperture of the saw blade and said second contact surface interfaces with a trailing edge of the saw blade for securing the saw blade within the retaining apparatus with the trailing edge of the saw blade wedged between said second contact surface and said base portion.

2. The retaining apparatus according to claim 1, wherein said rocker arm is biased toward an inner edge of the aperture.

3. The retaining apparatus according to claim 1, wherein said first contact surface has a convex contour.

4. A saw blade set and clamping system for use therewith, comprising;

a support structure including a base portion;

a rocker arm having a first contact surface, the rocker arm supported by said support structure and biased toward said base portion;

a stop extending from said base portion and having a second contact surface; and the saw blade set including a first saw blade having a rear edge for communication with said stop and a mounting aperture for communication with said rocker arm, said mounting aperture of said first saw blade disposed inboard a first predetermined distance from said rear edge of said first saw blade, and a second saw blade having a thickness greater than said first saw blade and a rear edge for communication with said stop and a mounting aperture for communication with said rocker arm, said mounting aperture of said second saw blade disposed inboard a second predetermined distance, shorter than said first predetermined distance from said rear edge of said second saw blade.

5. The clamp system according to claim 4, said first contact surface of said rocker arm is biased toward an inner edge of the mounting aperture of a blade.

6. The clamp system according to claim 5, wherein said second contact surface of said stop extends at an angle toward one of the saw blades.

7. The clamp system according to claim 6, wherein said first contact surface has a convex contour.

\* \* \* \* \*

UNITED STATES PATENT AND TRADEMARK OFFICE
CERTIFICATE OF CORRECTION

PATENT NO. : 6,662,698 B2
DATED : December 16, 2003
INVENTOR(S) : Thomas J. Wheeler et al.

It is certified that error appears in the above-identified patent and that said Letters Patent is hereby corrected as shown below:

<u>Column 6,</u>
Line 9, after "claim 4" insert -- wherein --.

Signed and Sealed this

Twenty-fifth Day of May, 2004

JON W. DUDAS
*Acting Director of the United States Patent and Trademark Office*